United States Patent

Hughes

[11] Patent Number: 5,953,177
[45] Date of Patent: Sep. 14, 1999

[54] WRITE SPLICING FOR HELICAL SCAN RECORDER

[75] Inventor: Timothy C. Hughes, Boulder, Colo.

[73] Assignee: Exabyte Corporation, Boulder, Colo.

[21] Appl. No.: 08/821,621

[22] Filed: Mar. 24, 1997

[51] Int. Cl.$^6$ .................................................. G11B 15/20
[52] U.S. Cl. ........................................... 360/74.1; 360/71
[58] Field of Search .............................. 360/74.1, 69, 71, 360/72.2, 73.06, 7; 386/46, 81

[56] References Cited

U.S. PATENT DOCUMENTS

| | | | |
|---|---|---|---|
| 4,970,612 | 11/1990 | Renders et al. | 360/71 X |
| 5,050,018 | 9/1991 | Georgis et al. | |
| 5,349,481 | 9/1994 | Kauffman et al. | |
| 5,535,068 | 7/1996 | Hughes. | |
| 5,602,694 | 2/1997 | Miles et al. | |
| 5,633,764 | 5/1997 | Ohta | 360/74.1 X |
| 5,781,688 | 7/1998 | Seong | 386/79 |

FOREIGN PATENT DOCUMENTS

| | | |
|---|---|---|
| 5-101539 | 4/1993 | Japan. |
| WO 95/13606 | 5/1995 | WIPO. |
| WO 95/13615 | 5/1995 | WIPO. |

*Primary Examiner*—Aristotelis M. Psitos
*Assistant Examiner*—James L Habermehl
*Attorney, Agent, or Firm*—Nixon & Vanderhye, P.C.

[57] ABSTRACT

Write splicing for a helical scan tape drive (30) involves, upon occurrence of a predetermined condition such as a buffer low condition, recording an indication of a tape transport transition (ITTT) on tape (31) and then recording dummy helical stripes (DSd1–DSdn) having deviant form as the magnetic tape is decelerated to a stop. After the predetermined condition is overcome, further deviant, dummy stripes (DSa1–DSan) are recorded as the tape is accelerated back to nominal tape transport speed. At the nominal tape transport speed, non-deviant stripes (S2) containing user data are again recorded on tape. A distance separating a first set of stripes [S1] (recorded prior to the occurrence of the predetermined condition) and a second set of stripes [S2] (recorded upon again attaining the nominal tape transport speed) is an integer multiple of the track pitch (P) of a non-deviant stripe. The write splice is thus performed without reversing the direction of tape transport.

25 Claims, 3 Drawing Sheets

WRITE SPLICING FOR HELICAL SCAN RECORDER

BACKGROUND

1. Field of Invention

This invention pertains to the recording of information on magnetic tape using magnetic tape drives, and particularly to apparatus and method for performing backhitch operations in helical scan magnetic tape recording.

2. Related Art and Other Considerations

For decades magnetic tape has been employed as a medium for storing information. Devices known as tape drives, tape decks, or tape recorders perform input and output operations, e.g., reading and recording operations, by transducing information from and to the tape. Information to be stored on a tape is obtained from a host device such as a computer. The information is transmitted from the host over a special connection or bus, e.g., SCSI bus, to the tape drive. Internally the tape drive has a buffer memory for storing information obtained from the host which the drive is not quite ready to record on the tape. When the information is ready to be recorded, the information passes through a write channel of the tape drive to a head. The head has gaps or other appropriate elements thereon which form magnetic flux transitions on the tape in the recording operation.

A reading operation for a tape drive is essentially the reverse of the recording operation. In the reading operation, the head detects magnetic flux transitions on the tape to obtain a read signal, processes the read signal in read circuitry, stores information ascertained from the read circuitry in the buffer, and ultimately transmits the information to a utilization device, e.g., the host, over the bus which connects the host and the tape drive.

One type of magnetic recording is helical scan recording. In helical scan recording, one or more head(s) are mounted on a rotating drum. The tape is transported past a portion of the periphery of the rotating drum so that, as the head on the drum contacts the tape, a stripe or track is recorded on the tape at an angle to the direction in which the tape is transported. The tape is transported through a tape path, which includes around the periphery of the drum, from a tape supply reel to a tape take-up reel. In some magnetic tape drives, a capstan is utilized to impart linear velocity to the tape. By contrast, a capstanless helical scan tape drive is shown in U.S. Pat. No. 5,602,694 for CAPSTANLESS HELICAL DRIVE SYSTEM to Robert J. Miles and James Zweighaft, which is incorporated herein by reference.

Helical scan tape drives record information on tape, and read information from tape, at fixed data rates. Frequently the tape motion must be stopped during normal data transfer. In the case of recording on tape, the tape drive must stop the tape motion when the data buffer is near empty, so that it can wait for the host to send more data to the tape drive. In the case of reading from tape, the inverse is true, in that the tape drive must stop tape motion after the buffer has been filled so as to wait for the host to empty the buffer. Stopping of tape motion also occurs after any operation is completed by the tape drive before the next command is issued from the host.

When tape motion is stopped, the last data transduced relative to the tape occurs at a data stop point before the tape decelerates to a stop. After the tape is stopped, the next command from the host to the tape drive will likely result in a continuation of the same type of data transfer that had occurred just prior to the stopping of the tape motion. Resumption of the data transfer requires, however, that the tape be accelerated back up to a proper or nominal tape transport rate for the data transfer, and that the head be located at the data stop point prior to forming a write splice upon further data transfer. Traditionally a motion known as a backhitch was implemented in order to enable such a resumption or write splice.

In a conventional backhitch, in order to resume data transfer, the tape had first to be moved in a reverse direction to position the tape before the data stop point, e.g., at a point earlier involved in the data transfer operation. Then, from that earlier point, the tape is accelerated in order to be up to nominal tape transport speed at the time the head reached the stop point. FIG. 6 graphically shows a conventional backhitch, with a tape traveling at a velocity $V_F$ in the forward direction. Point $P_{DS}$ shows a data stop position whereat the last data is transduced prior to deceleration of the tape. Point $P_{TS}$ shows the actual stop point of the tape. When data transfer is to resume, the tape must be accelerated to a rewind velocity $V_R$, then decelerated to a second tape stop point $P_{TS2}$ (the "earlier" point). Thereafter the tape is accelerated in the forward direction to reach velocity $V_F$ so that transducing can occur with the tape at nominal velocity when the head(s) pass point $P_{DS}$. The backhitch of FIG. 6 thus has a football type graphical illustration.

A conventional backhitch typically takes about 1.5 seconds. From the standpoint of data transfer, this backhitch time is a total loss, since the tape drive cannot record or read during the backhitch repositioning. Since the backhitch repositioning is a loss, the data buffer must be sized sufficiently to compensate for or hide this lapse in data transfer to/from the host. For example a tape drive in a record mode may have a data rate to tape of 4 MegaBytes per second (MB/s). If the host were providing data to such drive at a rate slightly less than the data rate to tape, e.g., 2.5 MB/s, the drive would eventually deplete the buffer and be forced to stop. The host would then be filling the buffer for 1.5 seconds while the drive was repositioning for sake of the backhitch. In order to avoid stopping the host, the drive's buffer would need to be 1.5×2.5=3.75 MB to cover the backhitch. Thus, the conventional backhitch influences the size of memory required for the buffer.

What is needed therefore, and an object of the present invention, is a method and apparatus for efficiently positioning tape in context of a backhitch.

SUMMARY

Write splicing for a helical scan tape drive involves, upon occurrence of a predetermined condition such as a buffer low condition, recording an indication of a tape transport transition on tape and then recording dummy helical stripes having deviant form as the magnetic tape is decelerated to a stop. After the predetermined condition is overcome, further deviant, dummy stripes are recorded as the tape is accelerated back to nominal tape transport speed. At the nominal tape transport speed, non-deviant stripes containing user data are again recorded on tape. A distance separating a first set of stripes (recorded prior to the occurrence of the predetermined condition) and a second set of stripes (recorded upon again attaining the nominal tape transport speed) is an integer multiple of the track pitch of a non-deviant stripe (i.e., a stripe recorded at the nominal tape transport speed). The write splice is thus performed without reversing the direction of tape transport.

In reading a tape upon which the write splice of the invention as occurred, upon detection on the tape the recording of the indication of a tape transport transition and, and in response thereto, the drum upon which the read head(s) is mounted is rotated a predetermined number of revolutions while the tape is transported at the nominal transport rate and the dummy deviant helical stripes recorded on the tape are effectively ignored. After the drum has rotated the predetermined number of revolutions, reading of user data is resumed on the second set of stripes.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
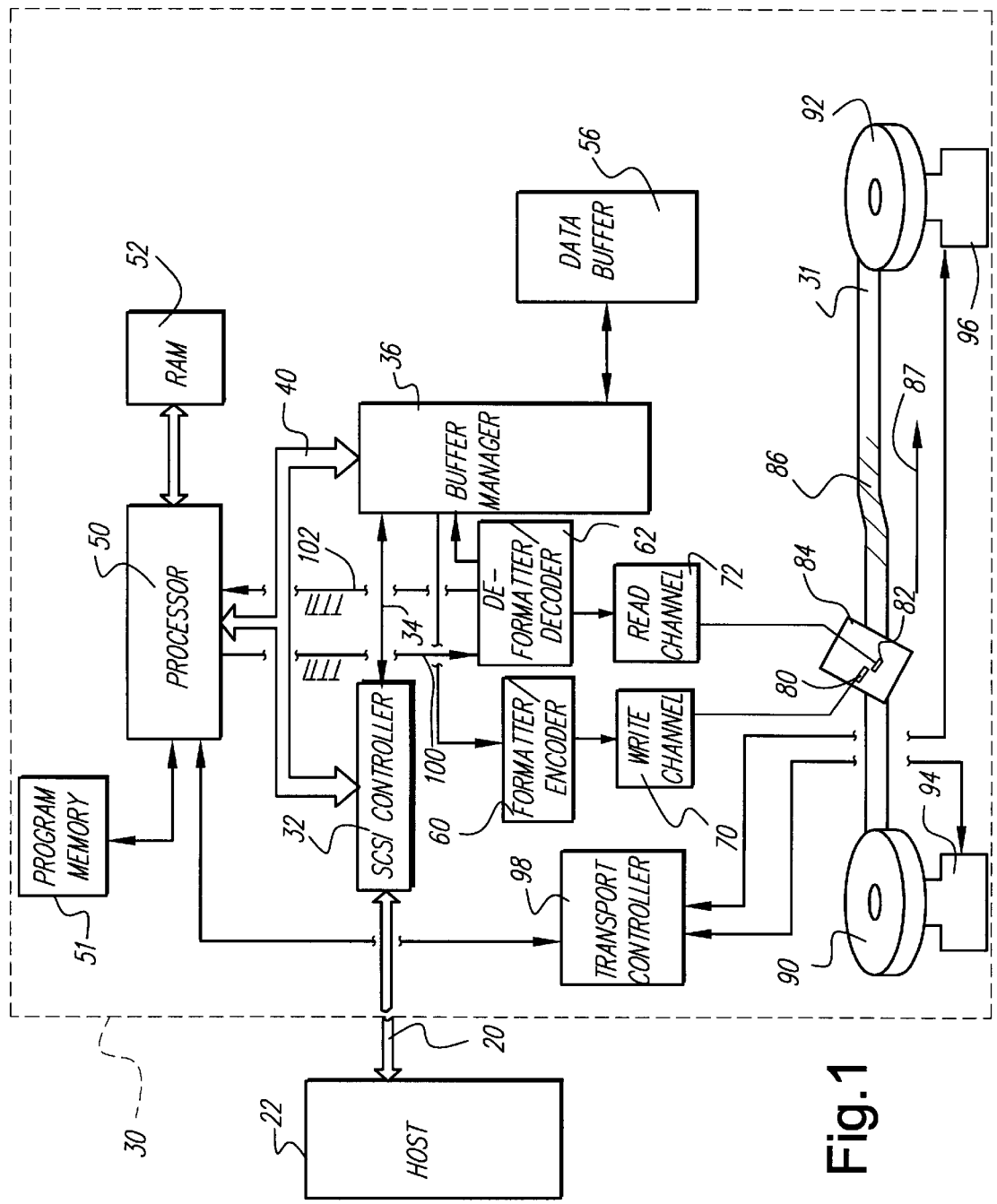
FIG. 1 is a schematic view of a tape drive according to the present invention, the tape drive being connected to a host.

FIG. 1 shows a SCSI bus 20 which connects a host computer 22 and a SCSI target storage device, particularly tape drive 30. In the illustrated embodiment, tape drive 30 is a helical scan tape drive such as a Mammoth™ tape drive manufactured by Exabyte Corporation which transduces information on/from 8 mm tape 31. Tape drive 30 includes a SCSI controller 32 which is connected to SCSI bus 20. Data bus 34 connects SCSI controller 32 to buffer manager 36. Both SCSI controller 32 and buffer manager are connected by a bus system 40 to processor 50. Processor 50 is also connected to program memory 51 and to a data memory, particularly RAM 52.

Buffer manager 36 controls, e.g., both storage of user data in buffer memory 56 and retrieval of user data from buffer memory 56. User data is data from host 22 for recording on tape 31 or destined from tape 31 to host 22. Buffer manager 36 is also connected to formatter/encoder 60 and to deformatter/decoder 62. Formatter/encoder 60 and deformatter/decoder 62 are, in turn, respectively connected to write channel 70 and read channel 72. Write channel 70 is connected to one or more recording elements or write head(s) 80; read channel is connected to one or more read elements or read head(s) 82.

In the illustrated embodiment, write head(s) 80 and read head(s) 82 are situated on a peripheral surface of rotating drum 84. Tape 31 is wrapped around drum 84 such that head(s) 80 and 82 follow helical stripes 86 on tape 31 as tape 31 is transported in a direction indicated by arrow 87 from a supply reel 90 to a take-up reel 92. Supply reel 90 and take-up reel 92 are typically housed in an unillustrated cartridge or cassette from which tape 31 is extracted into a tape path that includes wrapping around drum 84. Supply reel 90 and take-up reel 92 are driven by respective reel motors 94 and 96. Reel motors 94 and 96 are driven by transport controller 98, which ultimately is governed by processor 50. Operation and control of the tape transport mechanism including reel motors 94 and 96 is understood by the person skilled in the art with reference, for example, to U.S. patent application Ser. No. 08/337,620 for METHOD AND APPARATUS FOR CONTROLLING MEDIA LINEAR SPEED IN A HELICAL SCAN RECORDER, filed Nov. 10, 1994 and incorporated herein by reference.

Those skilled in the art will appreciate that write channel 70 includes various circuits and elements including a RLL modulator, a parallel-to-serial converter, and write current modulator. Similarly, the person skilled in the art understands that read channel 72 includes a data pattern and clock recovery circuitry, a serial-to-parallel converter, and, an RLL demodulator. These and other aspects of tape drive 30, including servoing, error correction, are not necessary for an understanding of the invention and accordingly are not specifically described herein.

Figure 3:
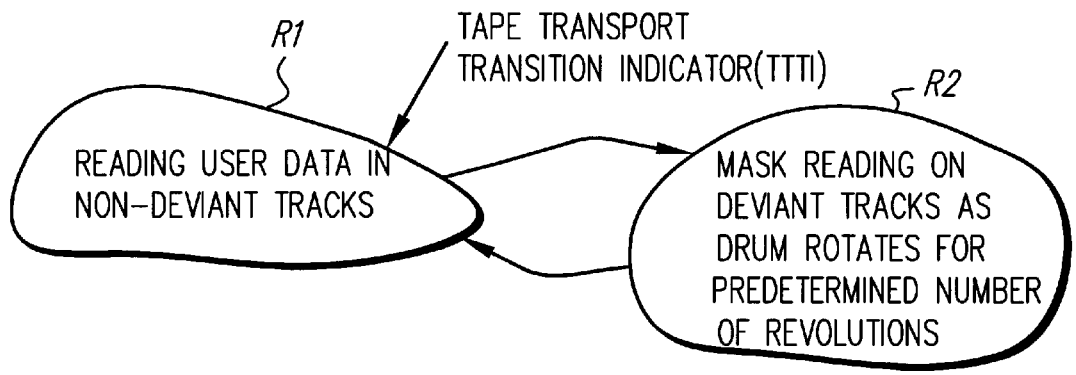
FIG. 3 is a state diagram showing states of operation during a reading from tape.

Program memory 51 has stored therein a set of coded instructions which are executed by processor 50. FIG. 3 shows operations performed by processor 50 in connection with the present invention. It should be understood that processor 50 performs many operations other than those illustrated in FIG. 3 in connection with control of tape drive 30, but for sake of clarity only those pertinent to the present invention are described herein.

Figure 2:
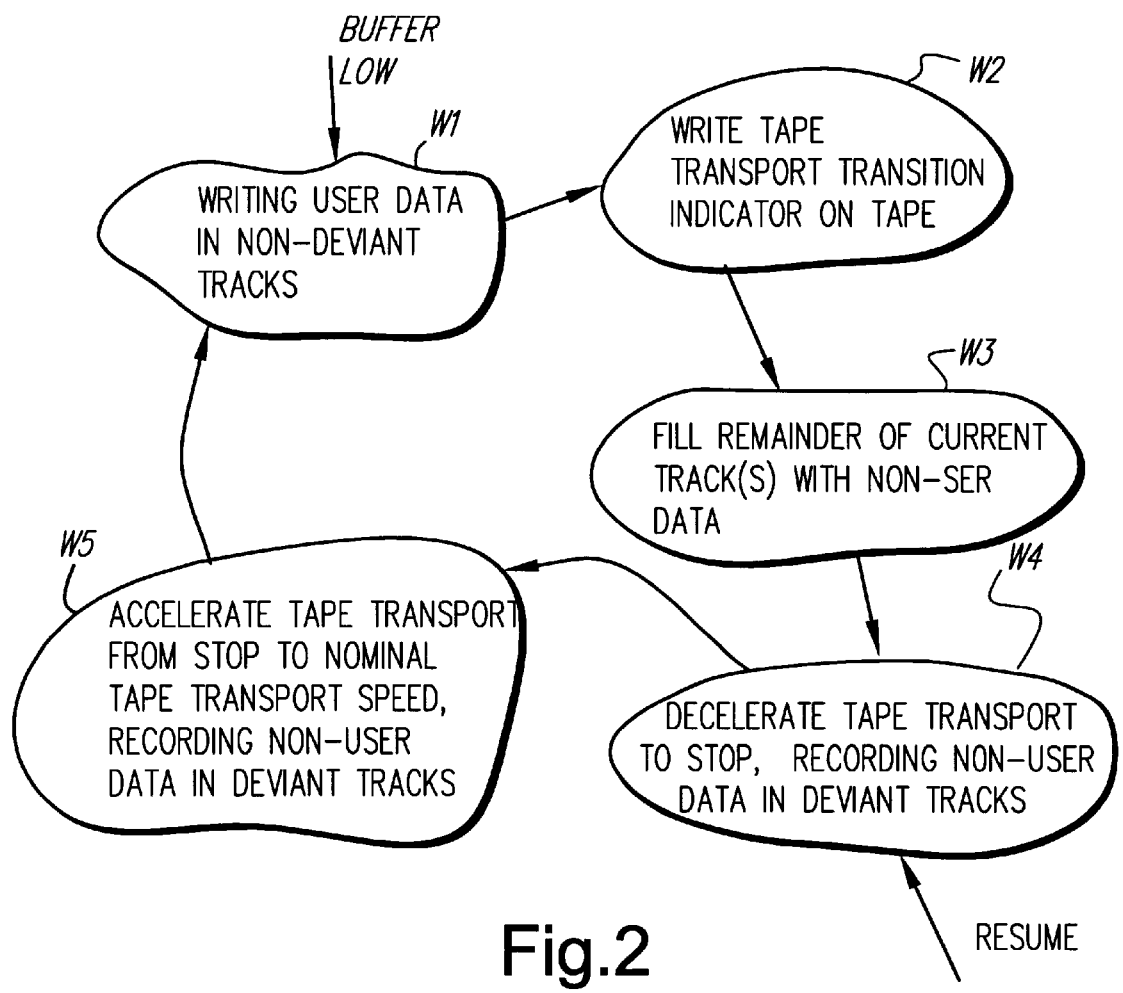
FIG. 2 is a state diagram showing states of operation during a recording to tape.
Figure 4:
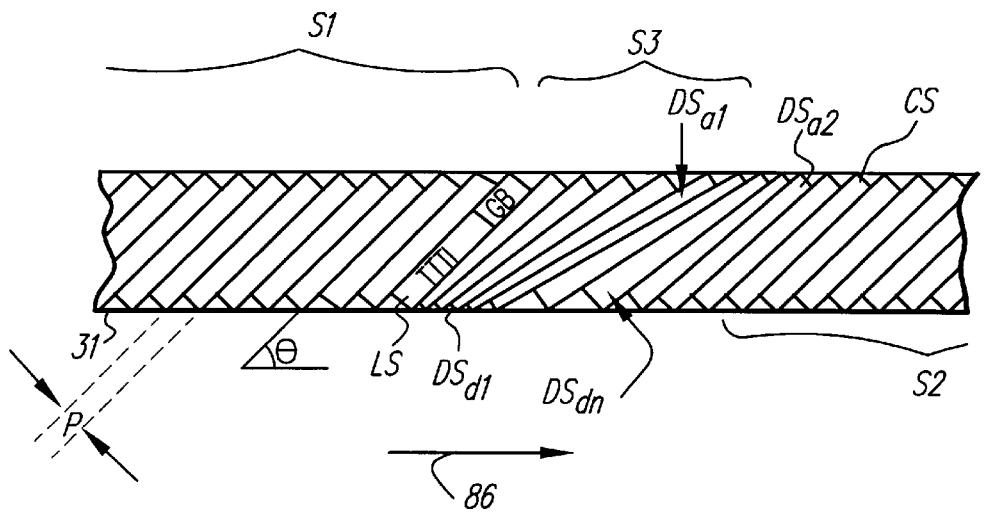
FIG. 4 is a diagrammatic view of stripes recorded on tape in accordance with the present invention.

Aspects of the invention pertinent to a recording or write operation are shown in FIG. 2. In FIG. 2, state W1 shows processor 50 supervising tape drive 30 so that user data is recorded in helical tracks on tape 31. In particular, as shown in FIG. 4, a first set of helical stripes S1 is being recorded on tape 31 with the tape being transported at the nominal tape transport speed VF (see FIG. 5). User data, also known as user information, is that information which, for a write operation, is obtained from host 22 and stored in data buffer 56 by buffer manager 36 preparatory to recording on tape. In a read operation, user data is the information that has been recorded on tape and which is destined for host 22.

Upon leaving data buffer 56, buffer manager 36 sends the user data to formatter 60, and then to write channel 70 whereby write head 80 records the user data in a stripe on tape 31. The user data is typically recorded in a plurality of blocks, there being one or more blocks, e.g, eight blocks, per stripe on the tape. During a normal write operation, i.e., when the tape is traveling at its nominal tape transport speed, the stripes are recorded at a nominal helical angle θ (see FIG. 4).

If, during the write operation, the content of user data in data buffer 56 should fall below a predetermined minimum, the transport of tape 31 must be stopped in order to give host 22 an opportunity to supply sufficient user data to data buffer 56. When the content of user data in data buffer 56 falls below the predetermined minimum, buffer manager 36 sends a "buffer low" signal on bus 40 to processor 50. Upon receipt of the buffer low signal, processor 50 puts tape drive 30 in state W2 of FIG. 2. In state W2, processor 50 issues a signal on line 100 to cause formatter 60 to generate a tape transport transition indicator (TTTI), which is recorded on tape 31. Thereafter, in accordance with control signals issued on bus 40, and as shown by state W3, processor 50 causes buffer the current stripe with non-user data, e.g., with gap blocks.

FIG. 4 shows stripe LS as being the last stripe of set S1, i.e., the last stripe having a portion of which can be recorded with user data before buffer manager 36 generates the buffer low signal. After the last user data that can be extracted from data buffer 56 is recorded, the TTTI is recorded in stripe LS as shown in FIG. 4. Thereafter, one or more gap blocks [GB] (having non-user data) are recorded to the end of last stripe LS. Although having no significance to the host, the gap blocks GB at least serve the function of recording over any previously recorded information on tape 31.

After the last stripe LS is recorded, and as shown by state W4, processor 50 decelerates the tape transport to stop the tape, and while so doing causes the recording of non-user data in deviant stripes on tape 31. In particular, in state W4, processor 50 issues a command to transport controller 98 so that the motors causing motion of tape 31, e.g., reel motors 94 and 96 in the illustrated embodiment, are driven to decelerate and stop tape 31. Further, using control signals on bus 40, processor 50 requires buffer manager 36 to send non-user data, e.g, dummy data, to formatter 60 and write channel 70 for recording in stripes on tape 31 as the tape comes to a stop. These stripes, recorded while the tape is not being transported at the nominal tape speed, e.g., during tape deceleration, are not recorded at angle θ, and thus are known as deviant stripes. In particular, during the tape deceleration prompted by state W4, a group of deviant stripes DS (e.g., stripes DSd1 through DSdn) are recorded after last stripe LS (see FIG. 4). The slower the tape travels during state W4, the smaller becomes the angle of inclination of the stripe with respect to tape transport direction 87, and the more the stripes overlap upon one another. At the end of state W4, tape 31 is stationary, i.e., V=0 (see FIG. 5).

When host 22 has sufficiently filled data buffer 56 with user data so that recording on tape 31 can continue, buffer manager 36 issues a "resume" signal on bus 40 to processor 50. Upon receipt of the "resume" signal, and as depicted in FIG. 2, state W5 is acquired. In state W5, the tape is accelerated from stop to the nominal tape transport speed, with the recording of non-user data occurring during the acceleration in deviant stripes on tape 31.

When in state W5, processor 50 issues a command to transport controller 98 so that the reel motors 90, 92 are energized to bring the tape from a stand-still to the nominal tape transport speed. Processor 50 also again requires buffer manager 36 to send non-user data, e.g, dummy data, to formatter 60 and write channel 70 for recording in stripes on tape 31 as the tape comes up to nominal In so doing, a set of deviant stripes Dsa1 through DSan are recorded on tape 31 as shown in FIG. 4. With the recording of each stripe Dsa1 through DSa2, the angle of inclination of the stripe more approaches the angle θ of a non-deviant stripe.

When the tape reaches nominal speed (VF in FIG. 5), state W1 is re-entered as tape drive resumes recording user data in non-deviant stripes. As shown in FIG. 4, a second set of user-data containing helical stripes S2 is recorded on tape 31, beginning with a first such stripe CS. Stripe CS contains the user data that follows the last user data recorded in stripe LS. The stripes in set S2 are non-deviant, i.e., are recorded at the angle θ. In state W1, processor 50 causes buffer manager 36 to resume sending user data to formatter 60 and write channel 70 for recording by write head 80 on tape 31.

As mentioned above, the deviant stripes contain non-user data which is recorded on tape 31 at least for the purpose of recording over any pre-existing information which may have earlier resided on tape 31.

In accordance with the present invention, the deceleration and acceleration of tape 31 during states W4 and W5 is timed such that a third set of stripes, a set S3 of deviant stripes is recorded on tape 31. As it turns out, the first set S1 of stripes is separated by the second set S2 of stripes by an integer multiple of the stripe pitch P of a non-deviant stripe (see FIG. 4). In the particular example shown in FIG. 4, the integer multiple is between 6 and 12.

Aspects of the invention pertinent to a read or reproduction operation are shown in FIG. 3. In FIG. 3, state R1 shows processor 50 supervising tape drive 30 so that user data is read from helical tracks on tape 31. In particular, assuming that FIG. 4 now depicts tape 31 as previously recorded by a tape drive in accordance with the invention, the first set of helical stripes S1 is read in state R1 as the tape is transported at the nominal tape transport speed VF. In state R1, user data is acquired from the tape, stored in buffer 56, and ultimately transferred to host 22.

When the tape transport transition indicator (TTTI) is encountered upon reading of last stripe LS, deformatter 62 sends a signal on line 102 to processor 50. Upon receiving the TTTI signal on line 102, processor 50 causes tape drive 30 to enter state R2. In state R2, drum 84 continues to rotate at its nominal rate and tape 31 continues to travel at its nominal tape transport rate. However, processor 50 realizes that the remainder of stripe LS and the information acquired by read head 82 during a predetermined number of next drum revolutions does not contain user data. Thus, the information acquired during state R2 is not stored in data buffer 56 and not sent to host 22. In effect, processor 50 sends a signal on bus 40 to buffer manager 36 requiring buffer manager 36 to ignore or mask the information acquired during state R2. The number of revolutions of drum 84 which occur during state R2 is the predetermined number of integer multiples of stripe pitch P.

After drum 84 has revolved the predetermined number of times, read head 82 will resume following the next track which contains user data, i.e., stripe SC (see FIG. 4). While drum 94 rotated during state R2, head 82 traveled over the region of tape which contained the deviant stripes DS. Since drum 84 rotated at its nominal tape transport rate, read head 82 did not travel perfectly over deviant stripes DS, but instead traveled where non-deviant stripes would otherwise have been recorded. Upon emerging from state R2, read head 82 resumes its reading with the next stripe which includes user data, effectively then returning to state R1.

For sake of simplicity the illustrated embodiment has one write head 80 and one read head 82. It should be understood, however, that typically more than one write head and more than one read head are employed. In such case, two tracks or stripes would be recorded for each one track shown in FIG. 4. For example, in a dual write head embodiment there would be two tracks LS—one generated by each write head. Likewise, there would be two tracks CS and twice the number of deviant tracks shown in FIG. 4.

The TTTI can be recorded in a number of ways. For example, the TTTI can be recorded as a separate block or part of a separate block. Alternatively, the TTTI can be recorded as a non-block field on the tape, such as part of a search field, for example.

Aspects of the operation of tape drive 30 involved with SCSI controller 32 and SCSI bus 20 are presented in U.S. patent application Ser. No. 08/800,394 filed Feb. 14, 1997 entitled "DYNAMIC DETERMINATION OF BUFFER THRESHOLDS FOR SCSI TARGET DEVICE", which is incorporated herein by reference now U.S. Pat. No. 5,872,997.

Figure 5:
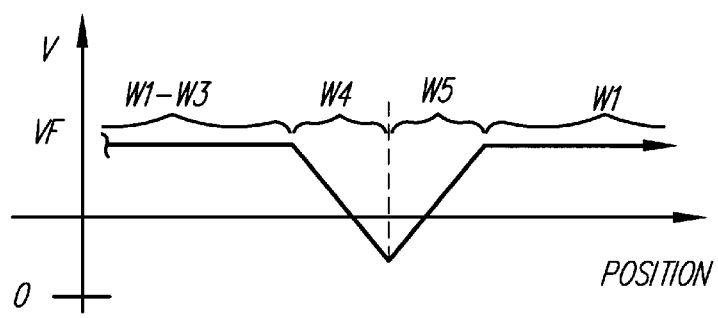
FIG. 5 is a graphical view of a tape movement in accordance with the present invention.
Figure 6:
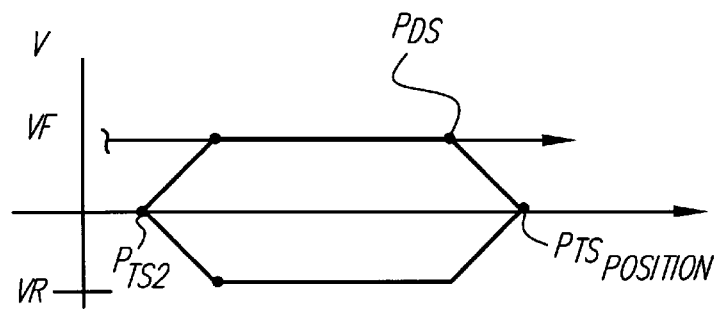
FIG. 6 is a graphical view of a conventional backhitch operation.

The present invention thus allows a much faster start and stop time during tape transport transitions, e.g., write splices. The time required for tape 31 to simply accelerate from 0 to $V_F$ in FIG. 5 is considerably shorter than the time required in conventional devices for the tape to be rewound and then accelerated back to the nominal transport rate (see FIG. 6). In addition, the present invention advantageously facilitates use of a smaller sized data buffer 56.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A helical scan tape drive comprising:
    a tape transport system which moves the tape in at least a first direction along a tape transport path;
    a rotating drum which has thereon at least one head for transducing information in helical stripes having a predetermined stripe pitch as the tape is transported at a nominal tape transport rate past the drum along the tape transport path; and
    a controller which, after completion of recording of a first set of helical stripes with the tape being transported in the first direction, and upon occurrence of a predetermined condition, without allowing the tape to be transported in a direction other than the first direction, interrupts the transducing of user information to allow the tape to decelerate, then accelerate to the nominal tape transport rate prior to resuming the transducing of user information with recording of a second set of helical stripes, and wherein the second set of stripes is separated from the first set of stripes by an integer multiple of the predetermined stripe pitch.

2. The apparatus of claim 1, wherein tape drive further includes a data buffer memory, and wherein the predetermined condition is related to a degree of filling of a data buffer memory.

3. The apparatus of claim 1, wherein the controller also causes an indication of a tape transport transition to be recorded on the tape.

4. The apparatus of claim 3, wherein the controller causes the indication of the tape transport transition to be recorded in the first set of stripes.

5. A helical scan tape drive comprising:
    a tape transport system which moves the tape in at least a first direction along a tape transport path;
    a rotating drum which has thereon at least one head for transducing information in helical stripes having a predetermined stripe pitch as the tape is transported at a nominal tape transport rate past the drum along the tape transport path; and
    a controller which, after completion of recording of a first set of helical stripes with the tape being transported in the first direction, and upon occurrence of a predetermined condition, without allowing the tape to be transported in a direction other than the first direction, interrupts the transducing of user information to allow the tape to decelerate, then accelerate to the nominal tape transport rate prior to resuming the transducing of user information with recording of a second set of helical stripes;
    wherein the controller causes a recording of non-user data on a third set of stripes while the tape is being decelerated and accelerated.

6. A helical scan tape drive comprising:
    a tape transport system which moves the tape in at least a first direction along a tape transport path;
    a rotating drum which has thereon at least one head for transducing information in helical stripes having a predetermined stripe pitch as the tape is transported at a nominal tape transport rate past the drum along the tape transport path; and
    a controller which, after completion of recording of a first set of user-data helical stripes with the tape being transported in the first direction at a nominal tape transport rate, and upon occurrence of a predetermined condition, records a set of non-user data stripes while the tape is both decelerated and accelerated while being transported in the first direction, and upon the tape again reaching the nominal tape transport rate, records a second set of user-data helical stripes.

7. The apparatus of claim 6, wherein the second set of stripes is separated from the first set of stripes by an integer multiple of a predetermined stripe pitch.

8. The apparatus of claim 6, wherein tape drive further includes a data buffer memory, and wherein the predetermined condition is related to a degree of filling of a data buffer memory.

9. The apparatus of claim 6, wherein the controller also causes an indication of a tape transport transition to be recorded on the tape.

10. The apparatus of claim 9, wherein the controller causes the indication of the tape transport transition to be recorded in the first set of stripes.

11. A helical scan tape drive comprising:
    a tape transport system which moves the tape in at least a first direction along a tape transport path;
    a rotating drum which has thereon at least one head for transducing information in helical stripes having a predetermined stripe pitch as the tape is transported at a nominal tape transport rate past the drum along the tape transport path; and
    a controller which, during a mode of reading user data from the tape, detects on the tape a recorded indication of a tape transport transition and, in response thereto, causes the drum to rotate a predetermined number of revolutions while the tape is transported at the nominal transport rate prior to reading further user information recorded on the tape.

12. A method of operating a helical scan tape drive comprising:
    (1) recording information on magnetic tape as the tape is transported at a nominal tape transport rate in a first direction past a rotating drum upon which the head is mounted, the information being recorded on a first set of stripes having a predetermined stripe pitch; then
    (2) decelerating the transport of the tape upon occurrence of a predetermined condition; then
    (3) accelerating the transport of the tape without any direction reversal of the tape intermediate steps (2) and (3); then
    (4) recording further information between the head and the magnetic tape as the tape is transported at the nominal tape transport rate in the first direction past, the information being recorded in a second set of stripes, the second set of stripes being separated from the first set of stripes by an integer multiple of the predetermined stripe pitch.

13. The method of claim 12, wherein the drum rotates during steps (2) and (3) whereby the second set of stripes is separated from the first set of stripes by the integer mutliple of the predetermined stripe pitch.

14. The method of claim 12, wherein the predetermined condition is related to a degree of filling of a data buffer included in the tape drive.

15. The method of claim 12, further comprising recording on the tape an indication of a tape transport transition.

16. The method of claim 15, further comprising recording the indication of the tape transport transition in the first set of stripes.

17. The method of claim 12, further comprising recording non-user data on a third set of stripes during steps (2) and (3).

18. A method of operating a helical scan tape drive comprising:
  (1) recording a first set of user information stripes on magnetic tape as the tape is transported at a nominal tape transport rate in a first direction past a rotating drum upon which the head is mounted; then
  (2) decelerating the transport of the tape upon occurrence of a predetermined condition;
  (3) accelerating the transport of the tape without any direction reversal of the tape intermediate steps (2) and (3);
  (4) recording a set of non-user information stripes during steps (2) and (3); and then
  (5) recording a second set of user information stripes between at the nominal tape transport rate in the first direction past, the information being recorded in a second set of stripes.

19. The method of claim 18, wherein the second set of stripes is separated from the first set of stripes by an integer multiple of a predetermined stripe pitch.

20. The method of claim 18, wherein the predetermined condition is related to a degree of filling of a data buffer included in the tape drive.

21. The method of claim 18, further comprising recording on the tape an indication of a tape transport transition.

22. The method of claim 21, further comprising recording the indication of the tape transport transition in the first set of stripes.

23. A method of operating a helical scan tape drive comprising:
  (1) reading user information recorded on magnetic tape as the tape is transported at a nominal tape transport rate in a first direction past a rotating drum upon which the head is mounted,
  (2) detecting on the tape a recorded indication of a tape transport transition and, in response thereto,
  (3) rotating the drum a predetermined number of revolutions while the tape is transported at the nominal transport rate prior to reading further user information recorded on the tape.

24. The method of claim 23, wherein in step (1) the information is read from a first set of stripes having a predetermined stripe pitch, wherein in step (2) the further information is read from a second set of stripes, and wherein the second set of stripes is separated from the first set of stripes by an integer multiple of the predetermined stripe pitch.

25. A method of operating a helical scan tape drive comprising:
  (1) transducing information between a head and magnetic tape as the tape is transported at a nominal tape transport rate in a first direction past a rotating drum upon which the head is mounted, the information being transduced with respect to a first set of stripes having a predetermined stripe pitch; then
  (2) decelerating the transport of the tape upon occurrence of a predetermined condition; then
  (3) accelerating the transport of the tape upon removal of the predetermined condition without any direction reversal of the tape intermediate steps (2) and (3); then
  (4) transducing further information between the head and the magnetic tape as the tape is transported at the nominal tape transport rate in the first direction past, the information being transduced with respect to a second set of stripes, the second set of stripes being spaced separated from the first set of stripes by an integer multiple of the predetermined stripe pitch.

* * * * *